(12) United States Patent
Vondersaar

(10) Patent No.: US 10,075,759 B2
(45) Date of Patent: Sep. 11, 2018

(54) PSEUDO-INTERACTIVE PROGRAM GUIDE OVER A LOCAL NETWORK

(71) Applicant: THOMSON LICENSING, Issy les Moulineaux (FR)

(72) Inventor: Benjamin Vondersaar, Indianapolis, IN (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/900,422

(22) PCT Filed: Jun. 26, 2013

(86) PCT No.: PCT/US2013/047761
§ 371 (c)(1),
(2) Date: Dec. 21, 2015

(87) PCT Pub. No.: WO2014/209290
PCT Pub. Date: Dec. 31, 2014

(65) Prior Publication Data
US 2016/0156961 A1    Jun. 2, 2016

(51) Int. Cl.
*G06F 3/00* (2006.01)
*G06F 13/00* (2006.01)
(Continued)

(52) U.S. Cl.
CPC ..... *H04N 21/4345* (2013.01); *H04N 21/2143* (2013.01); *H04N 21/4312* (2013.01);
(Continued)

(58) Field of Classification Search
CPC .......... H04N 21/4345; H04N 21/2143; H04N 21/4312; H04N 21/43615; H04N 21/482; H04N 21/6118; H04N 21/8153
See application file for complete search history.

(56) References Cited

U.S. PATENT DOCUMENTS 7,434,245 B1 * 10/2008 Shiga .................. G06F 3/04817
                                                    348/E5.104
7,751,451 B2   7/2010 Honhart
(Continued)

FOREIGN PATENT DOCUMENTS

CN    101510994 A    8/2009
EP      2187630 A1   5/2010
(Continued)

*Primary Examiner* — Kyu Chae
(74) *Attorney, Agent, or Firm* — Joseph J. Opalach

(57) ABSTRACT

A pseudo-interactive program guide over a local network is described. One embodiment includes generating (510) a plurality views of a program guide corresponding to pictures of a portion of the content in the program guide, transmitting (540) a first view of the program guide on a first channel, and transmitting (550) a second view of the program guide on a second channel. Another embodiment includes receiving (620) a first channel broadcast over a local network in response to a first user input, the first channel including a program stream containing a view corresponding to a picture of a first portion of content in a program guide, and receiving (630) a second channel in response to a second user input, the second channel including a program stream containing a view corresponding to a picture of a second portion of content in a program guide, the second portion being different from the first portion.

32 Claims, 8 Drawing Sheets

(51) Int. Cl.
*H04N 5/445* (2011.01)
*H04N 21/434* (2011.01)
*H04N 21/214* (2011.01)
*H04N 21/482* (2011.01)
*H04N 21/61* (2011.01)
*H04N 21/81* (2011.01)
*H04N 21/431* (2011.01)
*H04N 21/436* (2011.01)

(52) U.S. Cl.
CPC ..... *H04N 21/43615* (2013.01); *H04N 21/482* (2013.01); *H04N 21/6118* (2013.01); *H04N 21/8153* (2013.01)

(56) References Cited

U.S. PATENT DOCUMENTS

| | | | |
|---|---|---|---|
| 7,929,696 | B2 | 4/2011 | Pedlow, Jr. |
| 8,910,211 | B1* | 12/2014 | Stettner .............. H04N 5/44543 725/39 |
| 2007/0101185 | A1 | 5/2007 | Ostrowka |
| 2008/0216119 | A1 | 9/2008 | Pfeffer et al. |
| 2010/0306804 | A1 | 12/2010 | Mountain |
| 2011/0061084 | A1* | 3/2011 | Bejerano ................ H04H 20/82 725/109 |
| 2011/0239251 | A1 | 9/2011 | Miller |
| 2012/0023523 | A1* | 1/2012 | Rajan ................. H04N 7/17318 725/39 |
| 2012/0026097 | A1 | 2/2012 | Gilson |
| 2012/0151528 | A1* | 6/2012 | Mathews ........... H04N 21/2355 725/41 |
| 2013/0145409 | A1 | 6/2013 | Vince |
| 2014/0189745 | A1* | 7/2014 | Michel .................. H04N 5/445 725/49 |

FOREIGN PATENT DOCUMENTS

| | | |
|---|---|---|
| EP | 2330821 | 6/2011 |
| EP | 2442583 | 4/2012 |
| WO | WO9951030 | 10/1999 |
| WO | WO0018114 | 3/2000 |
| WO | WO2006050135 | 5/2006 |
| WO | WO2011119523 | 9/2011 |

\* cited by examiner

PSEUDO-INTERACTIVE PROGRAM GUIDE OVER A LOCAL NETWORK

This application claims the benefit, under 35 U.S.C. § 365 of International Application PCT/US13/047761, filed Jun. 26, 2013, which was published in accordance with PCT Article 21(2) on Dec. 31, 2014 in English.

CROSS-REFERENCE TO RELATED APPLICATIONS

This application is related to the non-provisional application, PCT/US13/47762, entitled "Method and Apparatus For Communicating From Headend To Remote Control Device", which is commonly assigned, incorporated by reference herein, and currently filed herewith.

TECHNICAL FIELD

The present principles relate generally to electronic program guides and, more particularly, to a pseudo-interactive program guide provided from a head-end or gateway device over a local network (e.g., a local terrestrial or cable distribution network) to a receiving device.

BACKGROUND

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Individual in-room receivers (e.g., televisions, dedicated receivers, and so forth) cannot generate a guide. A headend device can receive program guide information from content or service providers and/or generate a guide and send the guide out over the distribution network.

Headends exist that output a program guide implemented as a scrolling non-interactive display, broadcast over a single quadrature amplitude modulation (QAM) channel. Thus, the user at the receiver end cannot interact with the guide.

Moreover, in the aforementioned prior art headends, no backchannel exists to facilitate communication from the in-room receiver to the distribution headend. Rather, only front-channel communication from the headend to the receiver exists.

LodgeNet™, a media provider specifically directed to hospitality and healthcare businesses, provides an interactive guide. However, the guide is dependent on a backchannel line of communication from the receivers to the headend.

Similar problems may exist in a home media distribution system. The ability to provide a backchannel line of communication from the various receivers distributed in the home to a home gateway device acting as a headend may be limited by the distribution system.

However, the user experience for television media content viewing is enhanced through the use of a program guide that is interactive in response to a user input. Therefore, there is a need for a program guide delivery mechanism over a local network that improves the user experience by providing a level of interactivity in response to user inputs.

SUMMARY

These and other drawbacks and disadvantages of the prior art are addressed by the present principles, which are directed to a pseudo-interactive guide over a local network.

According to an aspect of the present principles, A method is described including generating a plurality views of a program guide, each one of the plurality of views corresponding to a picture of a portion of the content in the program guide, transmitting a first view of the program guide from the plurality of views on a first channel, and transmitting a second view of the program guide from the plurality of views on a second channel, the second channel being different from the first channel.

According to another aspect of the present principles, an apparatus is described including a view processor that generates a plurality views of a program guide, each one of the plurality of views corresponding to a picture of a portion of the content in the program guide, and a transmitter coupled to the view processor, the transmitter transmitting a first view of the program guide from the plurality of views on a first channel, and transmitting a second view of the program guide from the plurality of views on a second channel, the second channel being different from the first channel.

According to a further aspect of the present principles, an apparatus is described including a receiver that receives a plurality of channels over a local network, the plurality of channels including programs streams associated with a plurality of views for portions of a program guide, and a user interface coupled to the receiver, the user interface receiving an input from a user and processing the input to control the receiver, wherein the receiver receives a first channel containing a first view from the plurality of views as a result of a first user input and receives a second channel containing a second view from the plurality of view as a result of a second user input.

According to yet another aspect of the present principles, a method is described including receiving a first channel from a plurality of channels broadcast over a local network in response to a first user input, the first channel including a program stream containing a view corresponding to a picture of a first portion of content in a program guide, and receiving a second channel from the plurality of channels broadcast over the local network in response to a second user input, the second channel including a program stream containing a view corresponding to a picture of a second portion of content in a program guide, the second portion being different from the first portion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
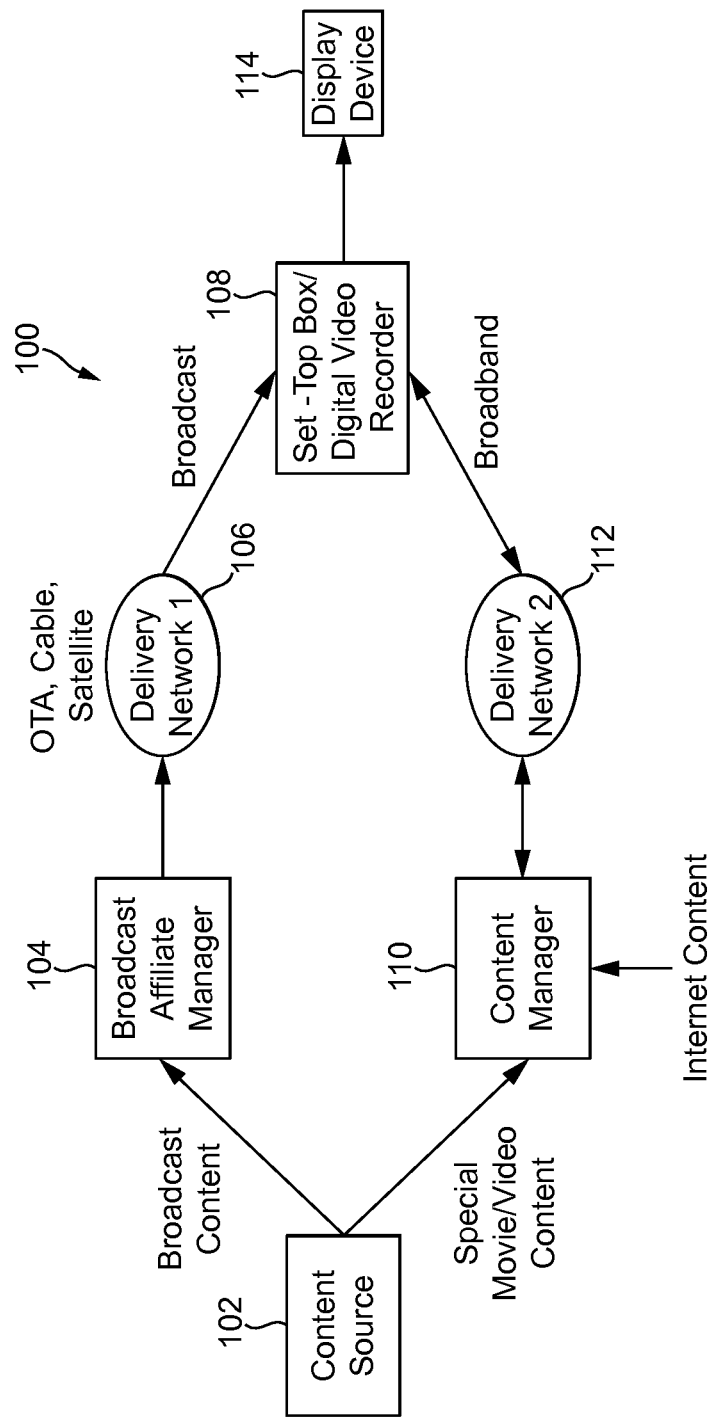
FIG. 1 shows an exemplary system 100 for delivering content to a home or end user, in accordance with an embodiment of the present principles.

The present principles are directed to a pseudo-interactive guide over a local network, such as a local cable or terrestrial broadcast signal distribution network.

Low end products, client devices, and products operating in settings with only one direction communications do not have electronic program guides (e.g., due to cost, processor power, tuner limitations, and so forth). Accordingly, it would be advantageous to have a simple guide system for low end set top boxes and other products that may not include interactivity functions.

In an embodiment, an interactive guide is generated at a video distribution headend and navigated by individual receivers (e.g., televisions, dedicated receivers, and so forth). The user does not technically interact with a guide generated in the receiver. Guide navigation keys actually tune to QAM sub-channels displaying guide data stills. Navigating the still images creates the illusion of an interactive guide for the user.

Thus, in an embodiment, the present principles involve a pseudo-interactive guide that is generated by a headend or a server, and is displayed on a client or slave device. The client or slave device is unable to generate a guide, so the headend or server generates a plurality of views of the guide, such as channels 1-20, 21-40, 41-60, and so forth. Each view is transmitted on a different QAM sub-channel. When the client navigates the guide, the receiver is actually tuning different sub-channels to get the different guide views.

Advantageously, the present principles do not involve or need two-way communication from the receiver to the headend. Thus, the present principles avoid the use of, or need for, a backchannel to facilitate providing the guide. Accordingly, the present principles provide an advantageous solution to help (e.g., a low end set top box) provide an interactive guide service without this backchannel. Of course, the present principles can be implemented in any quality level set top box, while maintaining the spirit of the present principles. Moreover, another advantage of the present principles is that receivers/television sets do not need to render the guide.

While one of ordinary skill in the art will readily contemplate various applications to which the present principles can be applied, the following description will focus on embodiments of the present principles applied to a set-top box. However, one of ordinary skill in the art will readily contemplate other devices and applications to which the present principles can be applied and that are within the scope of the present disclosure, given the teachings of the present principles provided herein. For example, the present principles can be incorporated into any device that has multimedia playback capability. Accordingly, the present principles can be incorporated into a set-top box with digital video recorder (DVR) capabilities, a stand-alone DVR, a home media server, a receiver, a computer media station, a tablet device, a home network gateway, a multi-media player, a home networking appliance, and so forth. It is to be appreciated that the preceding listing of devices is merely illustrative and not exhaustive.

Initially, a system for delivering various types of content to a user will be described.

FIG. 1 shows an exemplary system 100 for delivering content to a location (e.g., a home or business) or end user, in accordance with an embodiment of the present principles. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager 104 may collect and store the content, and may schedule delivery of the content over a delivery network, shown as delivery network 1 (106). Broadcast affiliate manager 104 may also deliver program information for current and future programs, in the form of a program guide, over the delivery network. Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a user's set top box/digital video recorder (DVR) 108 in a user's home, where the content will form part of the results of subsequent searches by the user.

A second form of content is referred to as special content. Special content may include content that may have been delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system, or explicitly into the search only such that content may be searched that has not yet been delivered to the user's set top box/digital video recorder 108. The content manager 110 may deliver the content to the user's set top box/digital video recorder 108 over a separate delivery network, delivery network 2 (112). The content manager 110 may also deliver additional program information for current and future programs, for instance in some form of a program guide, to the user over the delivery network. Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110.

The set top box/digital video recorder 108 may receive different types of content from one or both of delivery network 1 and delivery network 2. The set top box/digital video recorder 108 processes the content, and provides a separation of the content based on user preferences and commands. The set top box/digital video recorder may also include a storage device, such as a hard drive or optical disk drive, for recording and playing back audio and video content. Further details of the operation of the set top box/digital video recorder 108 and features associated with playing back stored content will be described below in relation to FIG. 2. The processed content is provided to a display device 114. The display device 114 may be a conventional 2-D type display or may alternatively be an advanced 3-D display. It should be appreciated that other devices having display capabilities such as wireless phones, PDAs, computers, gaming platforms, remote controls, multi-media players, or the like, may employ the teachings of the present disclosure and are considered within the scope of the present disclosure.

It is important to note that more than one set-top box/digital video recorder 108 may be included at a location (e.g., a home or business). Further, one or more of a set-top box/digital video recorder 108 may serve as a gateway or head-end device to other devices in the location. Operation as a gateway or head-end device includes receiving and redistributing the content (e.g., audio and video content and/or program guide information) to the other devices. These devices may include, but are not limited to set-top boxes, thin client devices, display devices, computers, tablets, and the like.

Figure 2:
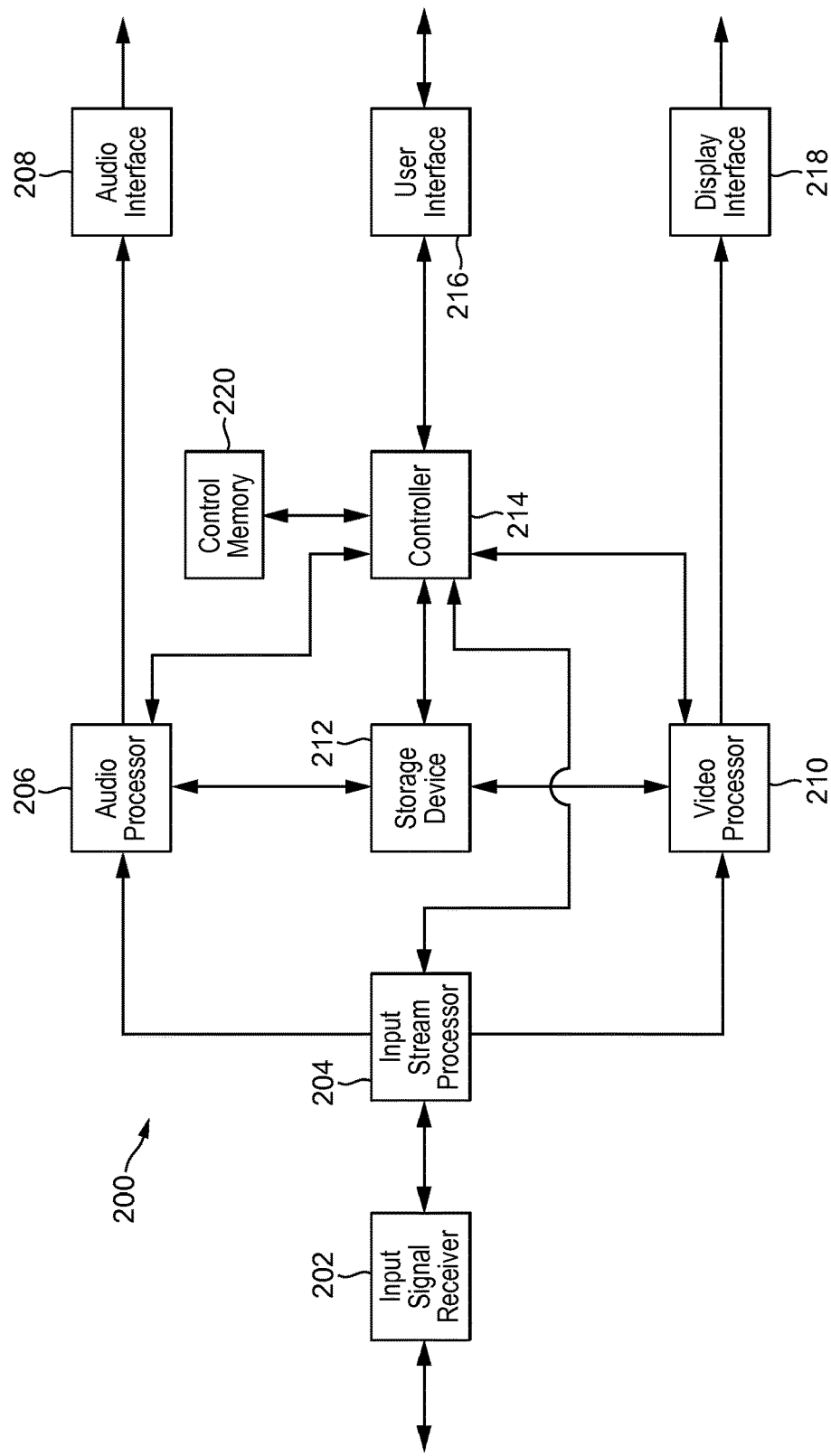
FIG. 2 shows an exemplary core of a set top box/digital video recorder 200, in accordance with an embodiment of the present principles.

FIG. 2 shows an exemplary core of a set top box/digital video recorder 200, in accordance with an embodiment of the present principles. The device 200 shown may also be incorporated into other systems including the display device 114 itself. In either case, several components necessary for complete operation of the system are not shown in the interest of conciseness, as they are well known to those skilled in the art.

In the device 200 shown in FIG. 2, the content is received in an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 202 based on user input provided through a control interface (not shown). It is to be appreciated that the input signal receiver 202 may in certain embodiments be a transceiver for two way communication to and from the set top box/digital video recorder 108. In certain embodiments, the transceiver will output information, e.g., a search request to delivery network 2 (112) to search for Internet content.

The decoded output signal from the input signal receiver 202 is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using an HDMI (High-Definition Multimedia Interface) cable or alternate audio interface such as via a SPDIF (Sony/Philips Digital Interconnect Format). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as high definition multimedia interface (HDMI). It is to be appreciated that the display interface 218 will generate the various screens for presenting the search results in a three dimensional array as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, the controller 214 performs searching of content, either stored or to be delivered via the delivery networks described above. The controller 214 is further coupled to control memory 220 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

To operate effectively, the user interface 216 of the present disclosure employs an input device. In one embodiment, the input device is a remote controller, with a form of motion detection, such as a gyroscope or accelerometer, which allows the user to move a cursor freely about a screen or display. In another embodiment, the input device is a controller in the form of a touch pad or touch screen remote that takes movements on the user's finger and translates this to the position of a cursor on the screen, or alternatively be used to provide a virtual keyboard. In other embodiments, the controller may include a full keyboard for typing search entries and also may include an accelerometer/gyroscope to track the user's movement to allow selection of elements to act as keys for a search. Other types of input devices such as conventional remotes, wireless devices such as phones and PDAs, motion capture devices or the like are also considered within the scope of the present disclosure.

Figure 3:
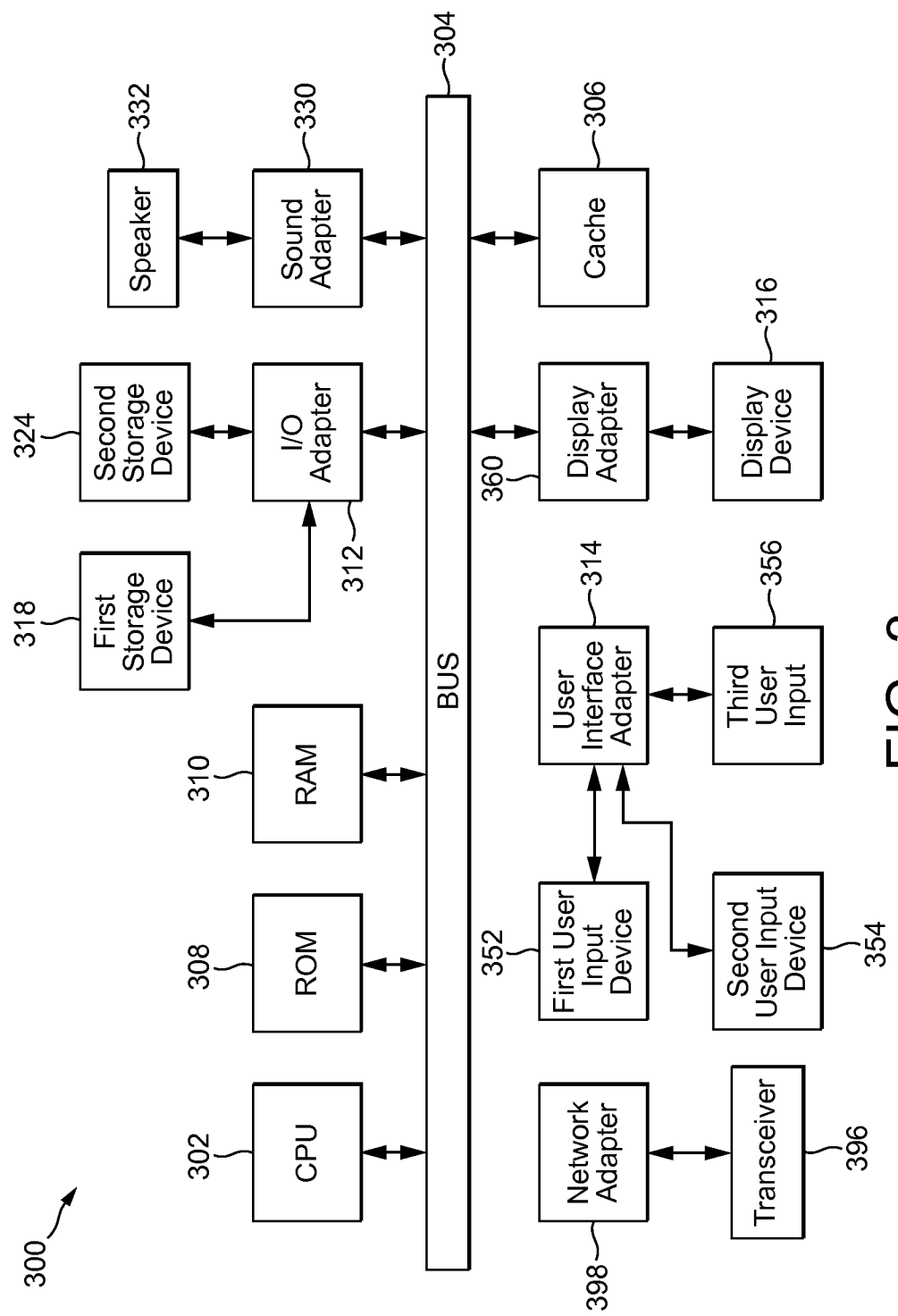
FIG. 3 shows an exemplary processing system 300 to which the present principles may be applied, in accordance with an embodiment of the present principles.

FIG. 3 shows an exemplary processing system 300 to which the present principles may be applied, in accordance with an embodiment of the present principles. The processing system 300 includes at least one processor (CPU) 302 operatively coupled to other components via a system bus 304. A memory cache 306, read only memory (ROM) 308, random access memory (RAM) 310, display adapter 360, an input/output (I/O) adapter 312, a user interface adapter 314, and a network adapter 398, are operatively coupled to the system bus 304. Processing system may be used as part of a gateway or head-end device used in a multi-client, multi-user, or multiple dwelling unit system.

A display device 316 is operatively coupled to system bus 304 by display adapter 360. Similarly, a speaker 332 is operatively coupled to system bus 304 by sound adaptor 330. A first storage device 318 and second storage device 324 (e.g., a magnetic or optical disk storage device) are operatively coupled to system bus 304 by I/O adapter 312.

A first user input device 352 (e.g., a mouse) and a second user input device 354 (e.g., a keyboard) are operatively coupled to system bus 304 by user interface adapter 314. A third user input interface 356 (e.g., an infra-red (IR) receiver) is also operatively coupled to system but 304. The first user input device 352, second user input device 354, and third user input interface 356 are used to input and output information to and from system 300.

A transceiver 396 is operatively coupled to system bus 304 by network adapter 398.

Of course, the processing system 300 may also include other elements (not shown), as readily contemplated by one of skill in the art, as well as omit certain elements. For example, various other input devices and/or output devices, including, but not limited to, various types of wireless and/or wired input and/or output devices, can be included in processing system 300, depending upon the particular implementation of the same, as readily understood by one of ordinary skill in the art. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

In one embodiment, transceiver 396 may include, or be replaced by, a broadcast modulator device. The broadcast modulator device may be capable of modulating and transmitting signals as broadcast channels in a QAM signal format. Each channel may include one or more subchannels, each capable of carrying a video program stream. CPU 302 may be capable of rendering a plurality of views of a program guide, including a first view and a second view. The program guide may be received from a satellite or other broadcast content service provider (e.g., broadcast affiliate manager 104 or content manager 110 described in FIG. 1). The program guide information may be stored in RAM 310 and processed to generate a program stream containing a still image or picture depicting a portion of the program guide. More particularly, each still image or picture corresponds to (that is, is representative of) a respective content on a respective subset of content channels from among a set of content channels available for reception. CPU 302 further performs a mapping between a respective picture (e.g., from among a set of pictures) and a respective quadrature amplitude modulation (QAM) sub-channel (e.g., from among a set of QAM sub-channels) to generate a map. The Broadcast modulator, as part of transceiver 396, transmits the map along with the still images or pictures of the portions of the program guide as subchannels in broadcast signal to another receiving device connected to the processing system 300. Further details regarding the generation and delivery of the program guide images will be described below.

It is to be appreciated that set-top box 200 described above with respect to FIG. 2 is a set-top box 200 for implementing respective embodiments of the present principles. Part or all of processing system 300 may be implemented in one or more of the elements of set-top box 200 (or other device).

Figure 4:
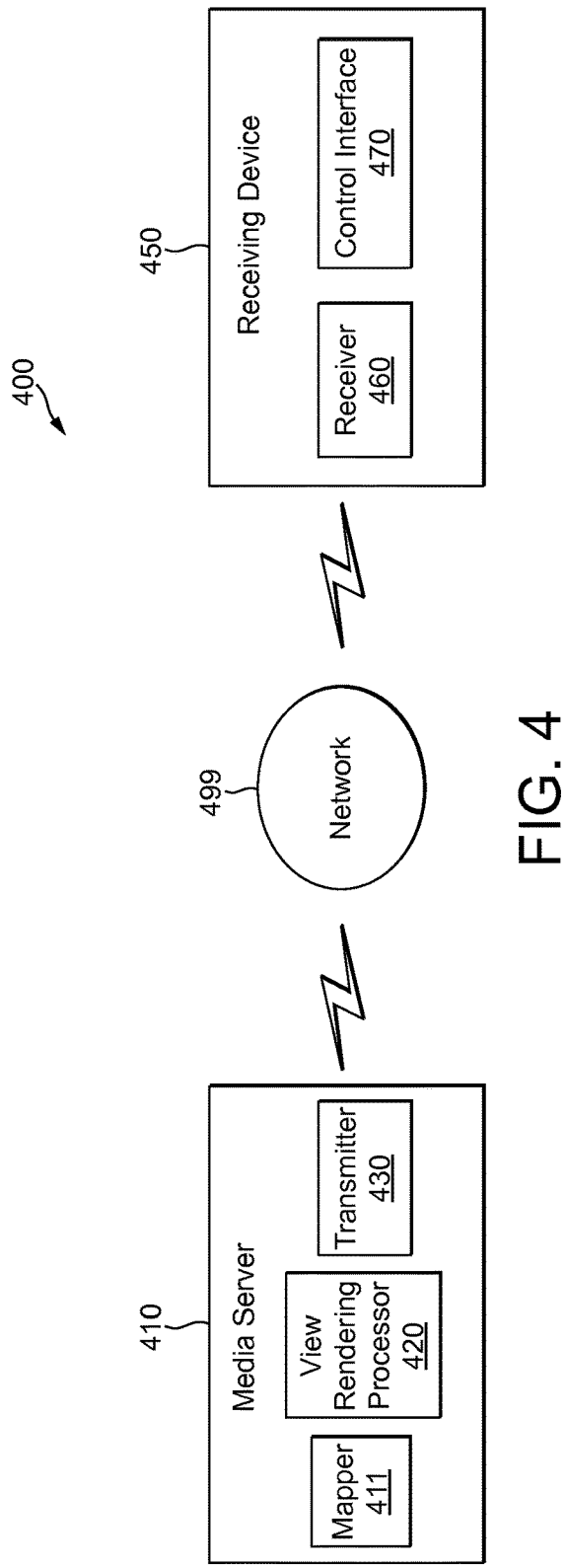
FIG. 4 shows an exemplary system 400 for providing a pseudo-interactive guide over a local network, in accordance with an embodiment of the present principles.

Moreover, it is to be appreciated that system 400 described below with respect to FIG. 4 is a system for implementing respective embodiments of the present principles. Part or all of processing system 300 may be implemented in one or more of the elements of system 400.

FIG. 4 shows an exemplary system 400 for providing a pseudo-interactive guide over quadrature amplitude modulation, in accordance with an embodiment of the present principles. The system 400 includes a headend 410 and a receiving device 450. The headend 410 and the receiving device 450 are interconnected via a network 499.

The headend 410 includes a mapper 411, a view rendering processor 420, and a transmitter 430.

The mapper 411 maps a respective picture (e.g., from among a set of pictures) to a respective quadrature amplitude modulation (QAM) sub-channel (e.g., from among a set of QAM sub-channels) to generate a map. Each picture corresponds to a respective content on a respective subset of content channels from among the set of content channels available for reception.

The view rendering processor 420 renders or generates a view of a program guide and at least another view of the program guide.

The transmitter 430 transmits the view of the program guide on a quadrature amplitude modulation sub-channel. The transmitter 430 also transmits the other view of the program guide on a different quadrature amplitude modulation sub-channel. The view and the other view are transmitted over a front-channel from the headend to a receiver connected to the headend.

In an embodiment, the view includes a picture representative of content on a subset of content channels from among a set of content channels available for reception. In an embodiment, the other or second view includes a different picture representative of a different content on a different subset of content channels from among the set of content channels available for reception.

Figure 5:
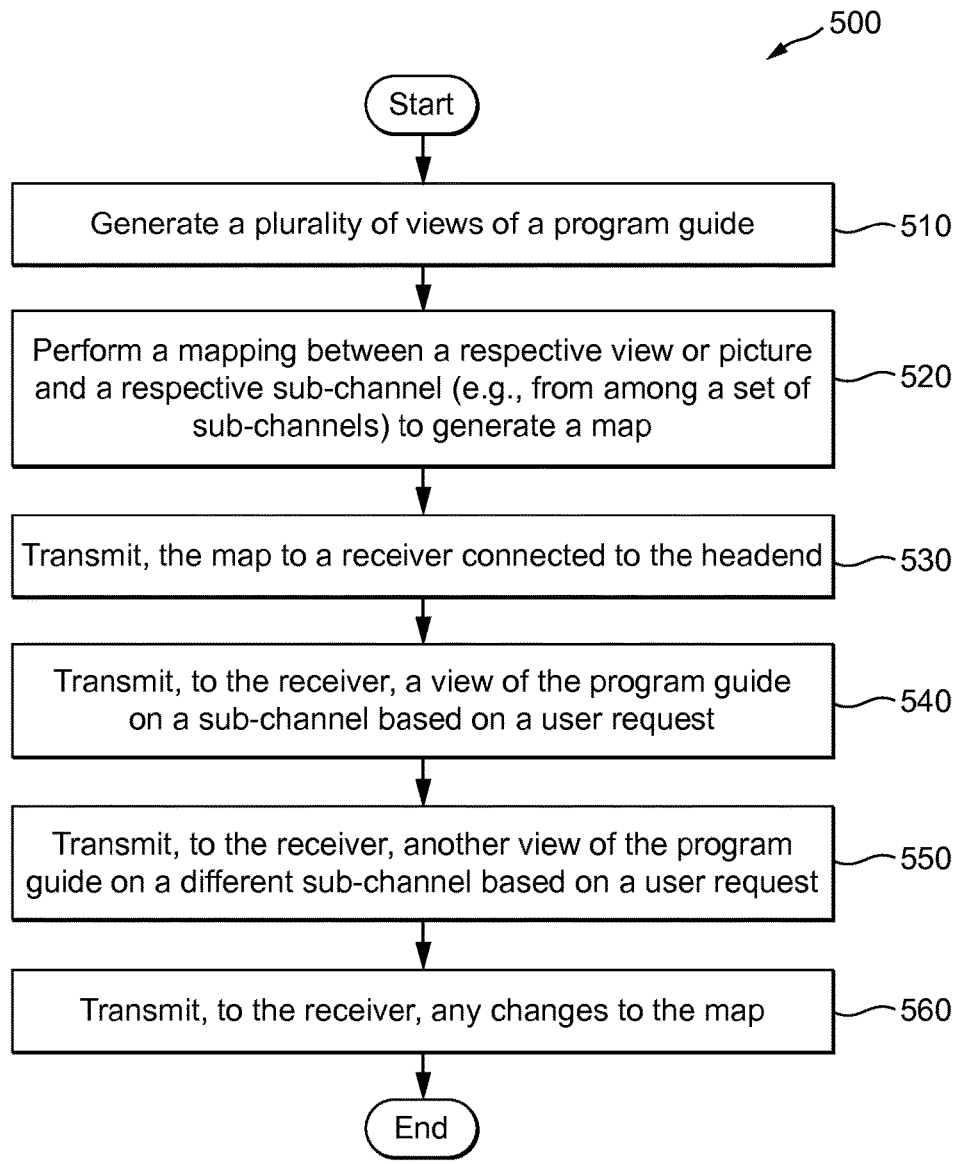
FIG. 5 shows an exemplary method 500 for providing a pseudo-interactive guide over a local network, in accordance with an embodiment of the present principles.
Figure 6:
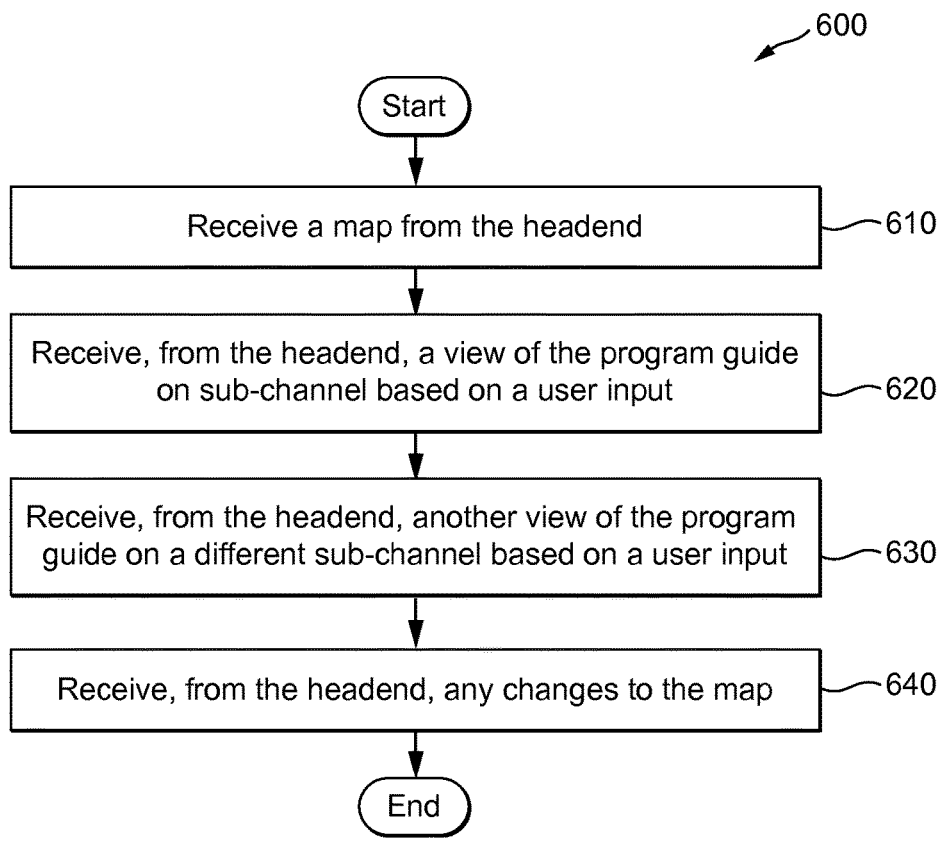
FIG. 6 shows another exemplary method 600 for providing a pseudo-interactive guide over a local network, in accordance with an embodiment of the present principles.

While the view and the other or second view, as well as other information, are described herein as being transmitted to a receiver connected to the headend, of course other devices can be used in place of the headend or receiver for this and some of the following steps described herein with respect to FIGS. 4-6, as readily appreciated by one of ordinary skill in the art.

The transmitter 430 additionally transmits the map to the receiver, using the front-channel. The transmitter 430 also transmits, to the receiver using the front-channel, any changes to the map.

The transmitter 430 further transmits an instruction to the receiver to recognize the view and the other view based on channel identifiers associated with the view and the other view. This helps the receiver determine how the view and the other view are to be recognized, e.g., from among a set of possible determination methods.

The receiving device 450 includes a receiver 460 and a control interface 470.

The receiver 460 receives a view of a program guide on a quadrature amplitude modulation sub-channel. The view includes a picture representative of content on a subset of content channels from among a set of content channels available for reception The receiver 460 also receives another, or a second, view of the program guide on a different quadrature amplitude modulation sub-channel responsive to a user request. The other view includes a different picture representative of a different content on a different subset of content channels from among the set of content channels available for reception.

The control interface 470 allows a user to provide navigation inputs, selections inputs, and so forth, in order to see various views of the program guide.

In operation, receiving device may receive a map corresponding to a mapping a respective picture, view, or still image (e.g., from among a set of pictures, views, or still images) and a respective quadrature amplitude modulation (QAM) sub-channel (e.g., from among a set of QAM sub-channels). Each picture, view, or still image corresponds to (that is, is representative of) a respective content on a respective subset of content channels from among a set of content channels available for reception as normally provided as part of a program guide. One or more views of the program guide may be received on a quadrature amplitude modulation sub-channel from the headend responsive to a user request. Each of the views is a content stream of separate pictures representative of a content on a subset of content channels from among a set of content channels available for reception.

The map and any changes to the map along with the one or more views are received from the headend by the receiving device 450 using a front-channel established from the headend to the receiver.

It is important to note that every static image or picture of the portion of the program guide may be rendered or generated in the headend. The headend distributes each guide still (picture) on a separate QAM sub-channel to reach the receivers. Further, the headend may generate and transmit the QAM sub-channels on an as needed basis based on user input.

Additionally, it is to be appreciated that processing system 300 may perform at least part of the methods described herein including, for example, at least part of method 500 of FIG. 5 and/or at least part of method 600 of FIG. 6. Similarly, part or all of system 400 may be used to perform at least part of method 500 and/or at least part of method 600. Also, part or all of set-top box 200 may be used to perform at least part of method 500 and/or at least part of method 600.

FIG. 5 shows an exemplary method 500 for providing a pseudo-interactive program guide over a broadcast channel on a local network, in accordance with an embodiment of the present principles. Method 500 may be used in conjunction with system 100 described in FIG. 1 as well as processing system 300 described in FIG. 3. Method 500 is more specifically described with respect to the operation of system 400 and more particularly to headend 410 described in FIG. 4.

At step 510, a plurality of views of a program guide are rendered or generated. The plurality of views includes a view (e.g., a first view) and another view (e.g., a second view) each depicting a different portion of the program guide. The plurality of views are generated by encoding each view into a program channel or subchannel using video encoding techniques (e.g., Moving Picture Experts Group (MPEG) standard MPEG-2 or MPEG-4).

At step 520, a mapping is performed between a respective view (e.g., from among the plurality of views, pictures, or still images) and a respective quadrature amplitude modulation (QAM) channel or sub-channel (e.g., from among a set of QAM sub-channels) to generate a map. Each view corresponds to (i.e., is representative of) a respective content on a respective subset of content channels from among a set of content channels available for reception as provided as part of a program guide.

At step 530, the map is transmitted to a receiver connected to the headend using a front-channel from the headend to a receiver connected to the headend.

At step 540, the view (e.g., a first view) of the program guide is transmitted to the receiver on a quadrature amplitude modulation sub-channel. The view includes a picture representative of content on a subset of content channels from among the set of content channels available for reception.

At step 550, the other view (e.g., a second view) of the program guide is transmitted to the receiver on a different quadrature amplitude modulation sub-channel. The other view includes a different picture representative of a different content on a different subset of content channels from among the set of content channels available for reception.

At step 560, any changes to the map are transmitted to the receiver.

The map, the view, the other view, and changes to the map are transmitted from the headend to the receiver using a front-channel established and broadcast from the headend (e.g., headend 410) to the receiver (e.g., receiver 450).

FIG. 6 shows another exemplary method 600 for receiving and processing a pseudo-interactive program guide over a broadcast channel, in accordance with an embodiment of the present principles. Method 600 may be used in conjunction with system 100 described in FIG. 1 as well as processing system 300 described in FIG. 3. Method 600 may also be used in device 200 described in FIG. 2. Method 600 is more specifically described with respect to the operation of system 400 and more particularly to receiver 450 described in FIG. 4.

At step 610, a map is received from the headend. The map corresponds to a mapping performed between a respective picture, view, or still image (e.g., from among a set of pictures, views, or still images) and a respective quadrature amplitude modulation (QAM) sub-channel (e.g., from among a set of QAM sub-channels). Each picture, view, or still image corresponds to (that is, is representative of) a respective content on a respective subset of content channels from among a set of content channels available for reception as normally provided as part of a program guide.

At step 620, a view (e.g., a first view) of a program guide on a quadrature amplitude modulation sub-channel is received from the headend responsive to a user request. The view includes a picture representative of content on a subset of content channels from among a set of content channels available for reception At step 630, another view (e.g., a second view) of the program guide on a different quadrature amplitude modulation sub-channel responsive to a user request is received from the headend. The other or second view includes a different picture representative of a different content on a different subset of content channels from among the set of content channels available for reception.

At step 640, any changes to the map are received from the headend.

The map, the view, the other second view, and changes to the map are received from the headend by the receiver using a front-channel established from the headend to the receiver.

In an embodiment, instead of generating an interactive guide interface within a receiver, every static image that is part of the guide is rendered or generated in the headend. The headend distributes each guide still (picture) on a separate QAM sub-channel to reach the receivers.

The guide stills may be mapped across QAM sub-channels in a predetermined, fixed manner, or the headend can direct the receivers to recognize the guide stills with channel identifiers or management services commands. Once the mapping is determined, there is no need for a backchannel for the receiver to navigate the guide. Any changes to the guide data channel mapping can be communicated along the front-channel from the headend.

When a user of an in-room receiver presses the "Guide" key command, the receiver tunes to the QAM channel displaying the guide data corresponding to the currently tuned channel. While the receiver is displaying a guide data channel, navigation key presses tune to other QAM channels that include the corresponding guide data still images.

Figure 7:
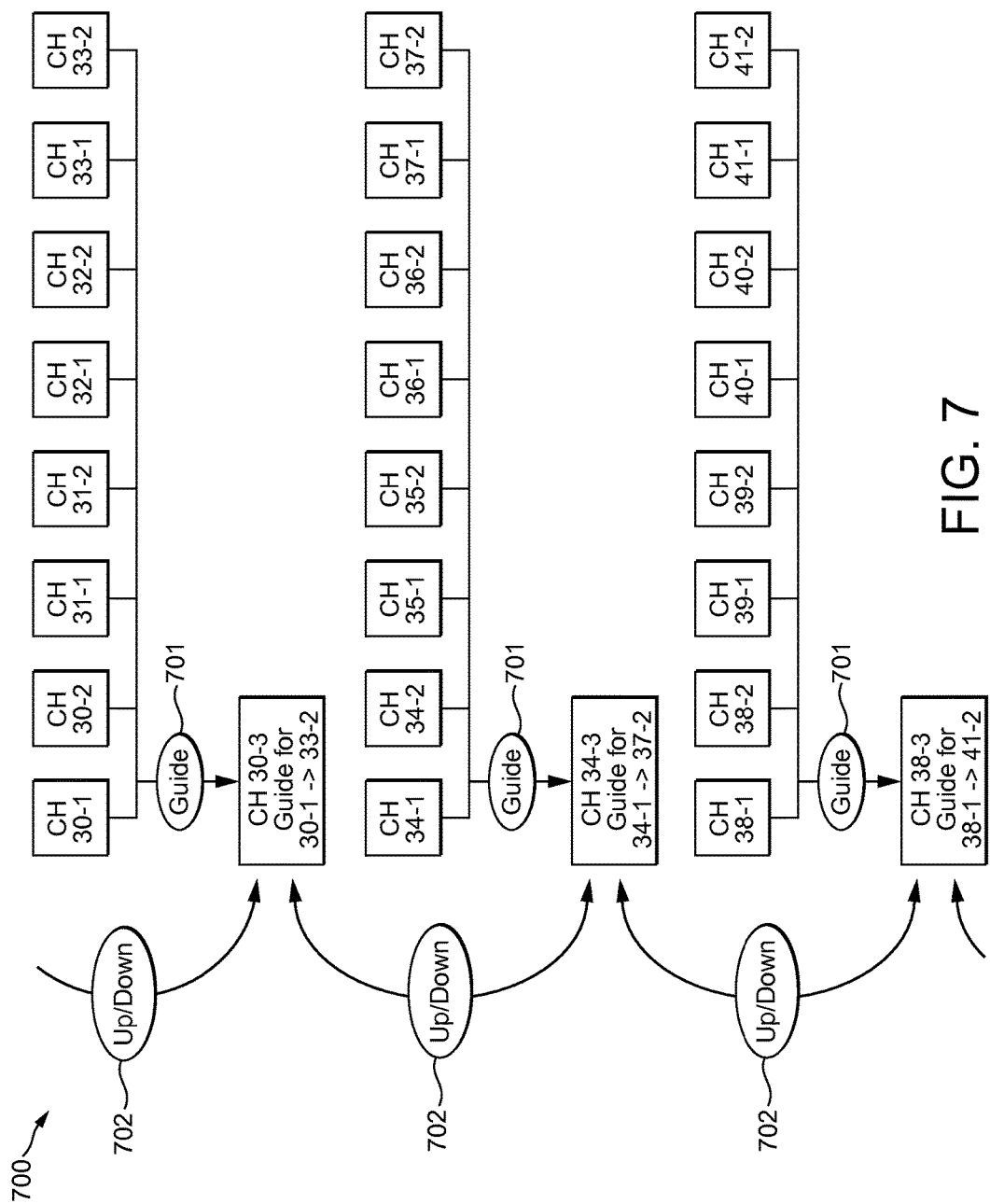
FIG. 7 shows an exemplary grouping of program guide images or stills 700 with interactive scrolling, in accordance with an embodiment of the present principles.

FIG. 7 shows an exemplary grouping of program guide images or stills 700 with interactive scrolling, in accordance with an embodiment of the present principles. In particular, FIG. 7 shows each guide still image including information from a group of channels mapped to and provided on a sub-channel (e.g., a QAM sub-channel). A user interface (e.g., user interface 216 shown in FIG. 2) responds to inputs from a user. Pressing the Guide key 701 while watching a current content channel will tune to the channel or sub-channel that includes that content channel's information along with information for other channels, such as channels adjacent to the current content channel. Using navigation keys 702 will tune to another channel or sub-channel that includes a different guide image to create the perception of scrolling for the user. In this manner, a user experience similar to a true interactive program guide may be provided to the user.

Figure 8:
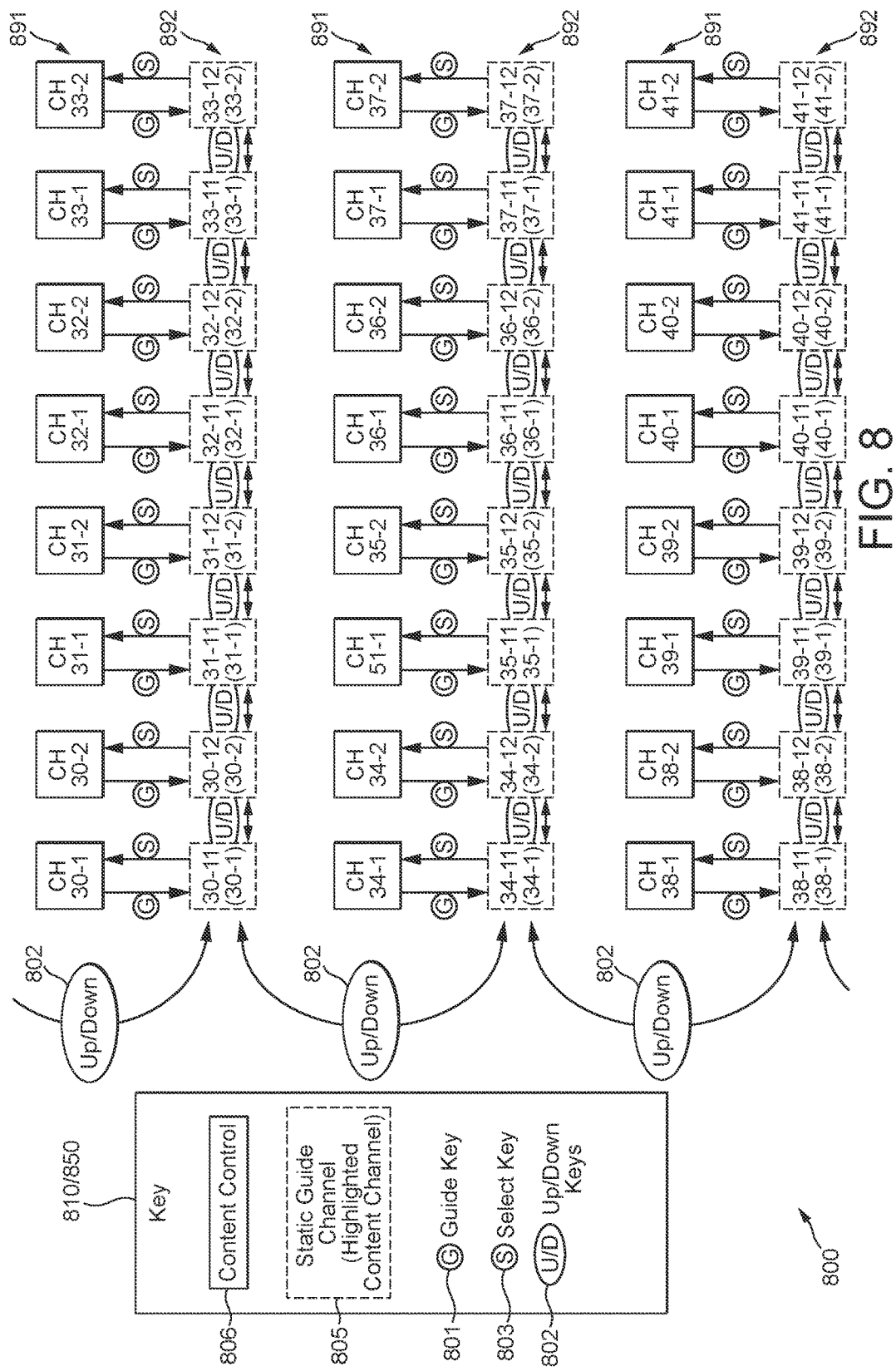
FIG. 8 shows an exemplary grouping of individual highlighted program guide images or stills 800 with interactive browsing, in accordance with an embodiment of the present principles.

FIG. 8 shows a set of exemplary individual highlighted program guide images or stills 800 with interactive browsing, in accordance with an embodiment of the present principles. In the embodiment of FIG. 8, every content channel, generally indicated by the reference numeral 891, has a corresponding guide channel/still image, generally indicated by the reference numeral 892. The guide channel will have its paired content channel highlighted on the guide as described in further detail herein below. A key 810 is provided to show the relationship between state indicators for the content channel, the guide channel with the highlighted content channel, and the navigation functions. The embodiment of FIG. 8 operates similarly to the embodiment of FIG. 7, and navigation keys 802 tune to different guide image channels to create the illusion of browsing. The implementation of FIG. 8 further enables direct tuning to, or selection of content (i.e., a content channel) using the pseudo-interactive guide. The highlighting feature allows the user to hit the Select key 803 while a certain content channel is highlighted, and the receiver will tune to the desired content channel. In FIG. 8, a remote control 850 is shown, that includes a Guide key 801, the navigation keys 802, the Select key 803, a static guide channel (highlighted content channel) state indicator 805, and a content channel state indicator 806. The static guide channel (highlighted content channel) state indicator 805 indicates the current highlighted content channel. The content channel state indicator 806 indicates the current content channel.

In further detail regarding the highlighting feature, the guide image is on a particular channel, indicated by the (top) number shown in the static guide channel (highlighted content channel) state indicator 805. On that guide image, the information for its corresponding content channel, indicated in parenthesis, is distinguished (highlighted). In this way, the user knows which channel they will be tuning to if they press the select key 803. Pressing the up/down keys from a guide channel creates the perception to the user of the highlighter moving from one information section to another. Moreover, a static guide channel with its corresponding content channel highlighted could also display specific programming information unique to that content channel. In other words, the view for the portion of the program guide that is transmitted may include a channel highlighted in the view and may be transmitted as a program stream on a sub-channel of the highlighted channel.

As examples of highlighting, the information can be highlighted using a bright colored box surrounding the information or a change in background color for that section of information. Of course, the present principles are not limited to the preceding highlighting approaches and, thus, other approaches for highlighting the aforementioned information can also be used in accordance with the teachings of the present principles, while maintaining the spirit of the present principles.

The present description illustrates the present principles. It will thus be appreciated that those skilled in the art will be able to devise various arrangements that, although not explicitly described or shown herein, embody the present principles and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Herein, the phrase "coupled" is defined to mean directly connected to or indirectly connected with through one or more intermediate components. Such intermediate components may include both hardware and software based components.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A method, comprising:
   generating a still image of a first view of a program guide and a still image of a second view of the program guide, the still image of the first view of the program guide corresponding to content from a first subset of a set of available channels in the program guide and the still image of the second view of the program guide corresponding to content from a second subset of the set of available channels in the program guide;
   mapping the still image of the first view to a first channel and the still image of the second view to a second channel to generate a map, the second channel being different than the first channel;
   transmitting the map to a receiver connected to a headend over a local network;
   transmitting the still image of the first view of the program guide on the first channel as a program stream; and
   transmitting the still image of the second view of the program guide on the second channel as a program stream.

2. The method of claim 1, wherein the still image of the first view and the still image of the second view are transmitted over the local network to the receiver connected to the headend.

3. The method of claim 2, wherein the method is performed such that a backchannel to communicate between the receiver and the headend is not used.

4. The method of claim 1, further comprising transmitting, to the receiver connected to the headend, changes to the map using a front-channel from the headend to the receiver.

5. The method of claim 1, wherein the still image of the first view and the still image of the second view are transmitted as program streams on sub-channels of a quadrature amplitude modulated broadcast channel.

6. The method of claim 1, wherein at least one of the transmitting the still image of the first view and transmitting the still image of the second view is based on a user input.

7. The method of claim 1, wherein the still image of the first view includes a portion of the program guide containing information for a currently viewed program and the still image of the second view is transmitted in response to a navigation key input from the user.

8. An apparatus, comprising:
a view processor that generates a still image of a first view of a program guide and a still image of a second view of the program guide, the still image of the first view of the program guide corresponding to content from a first subset of a set of available channels in the program guide and the still image of the second view of the program guide corresponding to content from a second subset of the set of available channels in the program guide;
a mapper coupled to the view processor, the mapper mapping the still image of the first view to a first channel and the still image of the second view to a second channel to generate a map, the second channel being different than the first channel; and
a transmitter coupled to the view processor and the mapper, the transmitter transmitting the map to a receiver connected to a headend through a local network, the transmitter further transmitting the still image of the first view of the program guide on a first channel as a program stream, and transmitting the still image of the second view of the program guide on a second channel as a program stream, the second channel being different from the first channel.

9. The apparatus of claim 8, wherein the transmitter transmits the still image of the first view via the first channel and the still image of the second view via the second channel to the receiver connected over the local network.

10. The apparatus of claim 8, wherein the transmitter transmits an instruction to the receiver connected over the local network to recognize the still image of the first view and the still image of the second view based on channel identifiers associated with the first view and the second view.

11. The apparatus of claim 8, wherein the transmitter transmits the still image of the first view and the still image of the second view as program streams on sub-channels of a quadrature amplitude modulated broadcast channel.

12. The apparatus of claim 8, wherein the still image of the first view includes a channel highlighted in a portion of the program guide and the transmitter transmits the still image of the first view as a program stream on a sub-channel of the highlighted channel.

13. An apparatus comprising:
a receiver that receives a plurality of channels over a local network, the plurality of channels including a first channel that includes a still image of a first view of a program guide, the first view corresponding to content from a first subset of a set of available channels in the program guide and a second channel that includes a still image of a second view of the program guide, the second view corresponding to content from a second subset of the set of available channels in the program guide, the receiver also receiving a map containing a mapping of the first view to the first channel and the second view to the second channel; and
a user interface coupled to the receiver, the user interface receiving an input from a user and processing the input to control the receiver, wherein the receiver tunes to the first channel containing the still image of the first view in response to a guide key input from the user and tunes to the second channel containing the still image of the second view in response to a navigation key input from the user based on the received map.

14. The apparatus of claim 13, wherein the receiver receives the still image of the first view and the still image of the second view from a headend device connected over a local network.

15. The apparatus of claim 13, wherein the receiver also receives an instruction from a headend device connected over a local network to recognize the still image of the first view and the still image of the second view based on channel identifiers associated with the first channel and the second channel.

16. The apparatus of claim 13, wherein the first channel and the second channel are sub-channels on a quadrature amplitude modulated broadcast channel.

17. The apparatus of claim 13, wherein the still image of the first view includes a channel highlighted in a portion of the program guide and the still image of the first view is received on a sub-channel of the highlighted channel, the highlighted channel being a channel that is currently being viewed.

18. A method comprising:
receiving a map that maps a first channel to a first view of a program guide and a second channel to a second view of the program guide
tuning to a first channel from a plurality of channels broadcast over a local network in response to a guide key input, the first channel including a still image of the first view of the program guide, the first view corresponding to content from a first subset of a set of available channels in the program guide; and
tuning to a second channel from the plurality of channels broadcast over the local network in response to a navigation key input, the second channel including a still image of the second view of the program guide, the second view corresponding to content from a second subset of the set of available channels in the program guide.

19. The method of claim 18, wherein the receiving a map further includes receiving an instruction from a headend device connected over the local network to recognize the still image of the first view and the still image of the second view based on channel identifiers associated with the first channel and the second channel.

20. The method of claim 18, wherein the still image of the first view and the still image of the second view are received from a headend device connected over the local network.

21. The method of claim 18, wherein the first channel and the second channel are sub-channels on a quadrature amplitude modulated broadcast channel.

22. The method of claim 18, wherein the still image of the first view includes a channel highlighted in a portion of the program guide and the still image of the first view is received on a sub-channel of the highlighted channel, the highlighted channel being a channel that is currently being viewed.

23. The apparatus of claim 9, wherein the receiver does not communicate to the transmitter using a backchannel.

24. The apparatus of claim 8, wherein the transmitter transmits, to a receiver connected to the headend, changes to the map using a front-channel from the headend to the receiver.

25. The apparatus of claim 8, wherein the transmitter transmits at least one of the still image of the first view and the still image of the second view based on a user input.

26. The apparatus of claim 8, wherein the still image of the first view includes a portion of the program guide containing information for a currently viewed program and the still image of the second view is transmitted in response to a navigation key input from the user.

27. The method of 1, wherein the transmitting includes transmitting an instruction to the receiver connected over the local network to recognize the still image of the first view and the still image of the second view based on channel identifiers associated with the still image of the first view and the still image of the second view.

28. The method of claim 1, wherein the still image of the first view includes a channel highlighted in a portion of the program guide and the transmitting includes transmitting the still image of the first view as a program stream on a sub-channel of the highlighted channel.

29. The method of claim 1, wherein the still image of the first view and the still image of the second view are generated such that a transition from the still image of the first view to the still image of the second view creates a perception of scrolling through the program guide.

30. The apparatus of claim 8, wherein the still image of the first view and the still image of the second view are generated such that a transition from the still image of the first view to the still image of the second view creates a perception of scrolling through the program guide.

31. The apparatus of claim 13, wherein a transition from the still image of the first view to the still image of the second view creates a perception of scrolling through the program guide.

32. The method of claim 18, wherein a transition from the still image of the first view to the still image of the second view creates a perception of scrolling through the program guide.

\* \* \* \* \*